United States Patent
Young

(10) Patent No.: US 6,728,419 B1
(45) Date of Patent: Apr. 27, 2004

(54) MULTI-TASKING MULTI-THREADED IMAGE PROCESSING SYSTEM AND METHOD FOR IMAGE CAPTURE DEVICES

(75) Inventor: Daniel L. Young, Palmyra, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/506,103

(22) Filed: Feb. 17, 2000

(51) Int. Cl.⁷ .................................................. G06K 9/36
(52) U.S. Cl. ..................... 382/276; 382/303; 382/304; 382/305
(58) Field of Search ................................ 382/303, 304, 382/305, 276, 155, 260, 249, 239; 345/539, 530; 708/442; 348/552

(56) References Cited

U.S. PATENT DOCUMENTS

| | | | |
|---|---|---|---|
| 3,962,706 A | 6/1976 | Dennis et al. ............ 340/172.5 |
| 4,229,790 A | 10/1980 | Gilliland et al. ............ 364/200 |
| 4,255,786 A | * 3/1981 | Holtey et al. ................ 364/200 |
| 4,466,061 A | 8/1984 | DeSantis et al. ............ 364/200 |
| 4,542,455 A | 9/1985 | Demeure ..................... 364/200 |
| 4,564,915 A | * 1/1986 | Evans et al. ................ 364/521 |
| 4,847,751 A | 7/1989 | Nakade et al. .............. 364/200 |
| 4,847,755 A | 7/1989 | Morrison et al. ........... 364/200 |
| 5,289,581 A | * 2/1994 | Berenguel et al. .......... 395/275 |
| 5,313,617 A | * 5/1994 | Nakano et al. ............. 395/500 |
| 5,371,887 A | 12/1994 | Yoshida et al. ............. 395/650 |
| 5,396,616 A | 3/1995 | Venable ..................... 395/500 |
| 5,557,795 A | 9/1996 | Venable ..................... 395/650 |
| 5,623,532 A | * 4/1997 | Houde et al. ................. 379/58 |
| 5,649,172 A | * 7/1997 | Tang .......................... 345/539 |
| 5,712,922 A | * 1/1998 | Loewenthal et al. ........ 382/155 |
| 6,061,785 A | * 5/2000 | Chiarot et al. .............. 712/236 |

* cited by examiner

*Primary Examiner*—Anh Hong Do
(74) *Attorney, Agent, or Firm*—Oliff & Berridge, PLC

(57) ABSTRACT

A method and apparatus for multi-threaded, multitasking processing of image data includes inputting a plurality of image data portions representing one or more images to be processed and putting the first portion of the image data in a memory storage portion. The memory storage portions may be called queues, stacks, address spaces, registers, files, arrays and buffers. While receiving a second portion of the image data, a first portion of the image data is analyzed for the need to be modified by one or more processing methods. Then the image data is modified as necessary by the one or more processing methods while possibly receiving additional image data, and analyzing the second portion of the image data for the need to be modified by the one or more processing methods.

24 Claims, 8 Drawing Sheets

MULTI-TASKING MULTI-THREADED IMAGE PROCESSING SYSTEM AND METHOD FOR IMAGE CAPTURE DEVICES

BACKGROUND OF THE INVENTION

1. Field of Invention

This invention relates to the field of image processing.

2. Description of Related Art

Scanners and other types of image capture devices have become ubiquitous office productivity tools for generating electronic images of physical original documents. Once an electronic image of a physical original document has been generated, the electronic image data can be used in an infinite variety of ways to increase the productivity and product quality of an office. Such image capture devices include desktop scanners, other standalone scanners, digital still cameras, digital video cameras, scanning input portions of digital copiers, facsimile machines and other multi-function devices that are capable of generating electronic image data from an original document, and the like. These image capture devices can also include image databases that store previously captured electronic image data.

However, as the cost of scanners and other image capture devices has dropped and the output quality of the captured electronic image data has improved, the amount of data produced by the image capture devices has gone up dramatically. Similarly, as users have become comfortable with capturing and using electronic image data obtained from original documents, the amount of scanning has gone up dramatically.

Additionally, methods of concurrently or multi-tasking or parallel processing of methods and data are well known in the prior art such as those disclosed in U.S. Pat. No. 4,229,790 to Gilliland, et al, U.S. Pat. No. 5,557,795 to Venable, U.S. Pat. No. 4,847,751 to Nakade et al., U.S. Pat. No. 5,371,887 to Yoshida et al., U.S. Pat. No. 4,466,061 to DeSantis et al. and U.S. Pat. No. 4,847,755 to Morrison et al., each incorporated herein by reference in their entirety.

SUMMARY OF THE INVENTION

Related methods for processing image data have taken the image data and processed it for speckle removal, sharpness, rotation, skew, color clarification and other methods in a linear process essentially handling all of the data at once, then upon completion, freeing up the scanner and/or image processor to receive new data. This was acceptable as long as the amount of image data to be processed was relatively small. With the advent of the ever-increasing number of features provided by image capture devices, the amount of image data generated by the image capture devices is creating an unacceptable wait between initial scanning and final image completion, such that the scanner or image capture device is not available for significant periods of time.

This invention provides systems, methods and apparatus that process the image in a multi-tasking, multi-threaded way such that the scanner is quickly freed up to begin the next scan operation.

In a first embodiment of the systems and methods according to this invention, the processing systems and methods include all mandatory processing methods that are deemed necessary for processing every image.

In a second embodiment of the systems and methods according to this invention, the processing methods include an analysis of the image for processes that may be recommended or optional to be applied to any particular image.

These and other features and advantages of this invention are described in or are apparent from the following detailed description of various embodiments of the systems methods and graphical user interfaces according to this invention.

BRIEF DESCRIPTION OF THE DRAWINGS

The invention will be described in relation to the following drawings in which reference numerals refer to like elements, and wherein.

DETAILED DESCRIPTION OF PREFERRED EMBODIMENTS

Figure 1:
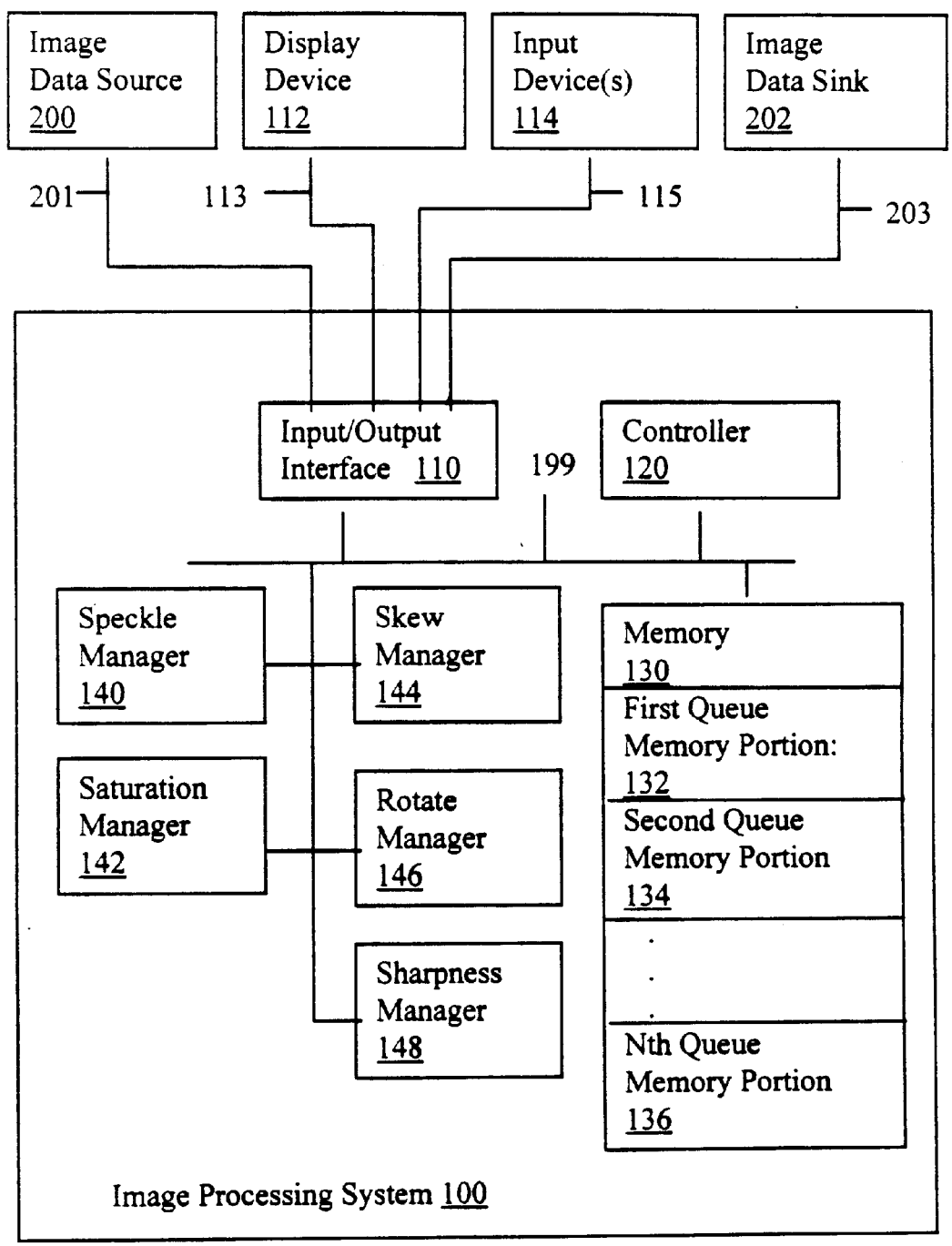
FIG. 1 is an exemplary embodiment of the apparatus for processing image data.

FIG. 1 shows a functional block diagram of one exemplary embodiment of an image processing system and apparatus 100 according to this invention. As shown in FIG. 1, the image processing system 100 includes an input/output interface 110 that connects the image processing system 100 to an image data source 200 via link 201, a display device 112 via link 113, one or more input devices 114 via link 115 and an image data sink 202 via link 203. The image processing system 100 also includes a controller 120, a memory 130, and one or more of a speckle manager 140, a saturation manger 142, a skew manager 144, a rotate manger 146 and a sharpness manger 148, all connect via a bus 199.

The controller 120 may be implemented as a main program circuit, a timer circuit, or an integrated circuit that calls the other managers 140–148, arranges the memory 130, and handles input/output events. Alternately, the system and apparatus may use an external controller (not shown) to handle generic functions, retaining the controller 120 to handle internal invoking of image processing cicuits 140–148.

The memory 130 includes one or more queues, stacks, address spaces, registers, files, arrays and buffers. As shown in FIG. 1, the memory 130 can include a first queue memory portion 132, a second queue memory portion 134 and an $N^{th}$ queue memory portion 136. These memory portions 132–136 are exemplary embodiments of one way of storing the received image data such that the input/output interface is freed up to accept additional image data.

The image data source 200 provides image data to the input/output interface 110 over link 201. Once the image data source has transmitted the image data to the input/output interface 110, the input/output interface 110 stores the image in the first queue memory portion of the memory 130 via link 199. Thus, once the first queue memory portion 132 has received the first portion of the image data, the input/output interface 110 is freed up from any further handling of the first portion of image data. Thus the image data source 200 is able to produce or transmit additional image data.

The controller 120 then scans each queue for image data available to be processed. When the controller 120 determines that the first queue memory portion 132 has data in it, the controller 120 invokes one of the image processing circuits 140–148.

The controller 120 may invoke the speckle manager 140. When invoked, the speckle manager 140 analyzes the image data in the first queue memory portion 132 to remove speckle noise. The speckle manager 140 may then remove the speckle noise or not as detailed below. After the speckle manager 140 has completed its analysis and/or modification, if necessary, of the image data, the speckle manager 140, under the control of the controller 120, stores the image data in the second queue memory portion 134.

The controller 120 may alternately invoke the saturation manager 142. When invoked, the saturation manager 142 analyzes the image data in the second queue memory portion 134 to remove speckle noise. The saturation manager 142 may then adjust the saturation level or not as detailed below. After the saturation manager 142 has completed its analysis and/or modification, if necessary, of the image data, the saturation manager 142, under the control of the controller 120, stores the image data in the third queue memory portion (not shown).

The controller 120 may alternately invoke the skew manager 144. When invoked, the skew manager 144 analyzes the image data in the third queue memory portion (not shown) to remove speckle noise. The skew manager 144 may then remove the skew or not as detailed below. After the skew manager 144 has completed its analysis and/or modification, if necessary, of the image data, the skew manager 144, under the control of the controller 120, stores the image data in the fourth queue memory portion (not shown).

The controller 120 may alternately invoke the rotate manager 146. When invoked, the rotate manager 146 analyzes the image data in the fourth queue memory portion (not shown) to rotate the image data. The rotate manager 146 may then rotate the image data or not as detailed below. After the rotate manager 146 has completed its analysis and/or modification, if necessary, of the image data, the rotate manager 146, under the control of the controller 120, stores the image data in the fifth queue memory portion (not shown).

The controller 120 may alternately invoke the sharpness manager 148. When invoked, the sharpness manager 148 analyzes the image data in the fifth queue memory portion (not shown) to rotate the image data. The sharpness manager 148 may then rotate the image data or not as detailed below. After the sharpness manager 148 has completed its analysis and/or modification, if necessary, of the image data, the sharpness manager 148, under the control of the controller 120, stores the image data in the Nth queue memory portion 136.

The image processing system 100 may have as many queues as needed to efficiently handle the image data. Those skilled in the art will understand that the order of invoking the image processing managers is exemplary and may be reordered as desired. Additional or fewer managers are also possible within the scope of the invention.

The image data source 200 is any device that stores or produces image data usable by the image processing system 100. The image data source 200 can be a scanner, a digital copier, a computer with a built-in scanner, a fax machine or any device suitable for storing and/or transmitting electronic image data. The image data source 200 may also be the client or server of a network, the Internet, a hard drive, floppy drive including diskette, or any other stored or transmitting means for transmitting electronic image data.

The display device 112 can be any device for displaying image data or the representation of an image data. Thus, the display device 112 can be a CRT monitor, an LCD display screen, combinations of LED or any other picture forming device.

The one or more input devices 114 can include any or all of a keyboard, a mouse, a graphical user interface, a touch pad, a voice recognition module or any other device used to give commands to the image processing system 100 or request information from the image processing system 100.

The image data sink 202 can be any known or later developed device that is capable of receiving the processed image data output by the image processing system 100 and either storing, transmitting or displaying the image data. The image data sink 202 can include printers, plotters, hard drives, floppy disk drives and disk network clients or servers, the Internet and projectors.

It should be understood that each of the circuits shown in FIG. 1 can be implemented as portions of a suitably programmed general purpose computer. Alternatively, each of the circuits shown in FIG. 1 can be implemented as a physically distinct hardware circuit within an ASIC, or using an FPGA, a PDL, a PLA or a PAL, or using discrete logic elements or discrete circuit elements. A particular form of each of the circuits shown in FIG. 1 is a design choice and will be obvious and predictable to those skilled in the art.

Further, it should be appreciated that the links 201, 113, 115, 203 and 199 connecting the various portions of FIG. 1 can be a wired or a wireless link to a network (not shown). The network can be a local area network, a wide area network, an internet, the Internet or any other distributed processing and storage network.

Figure 2:
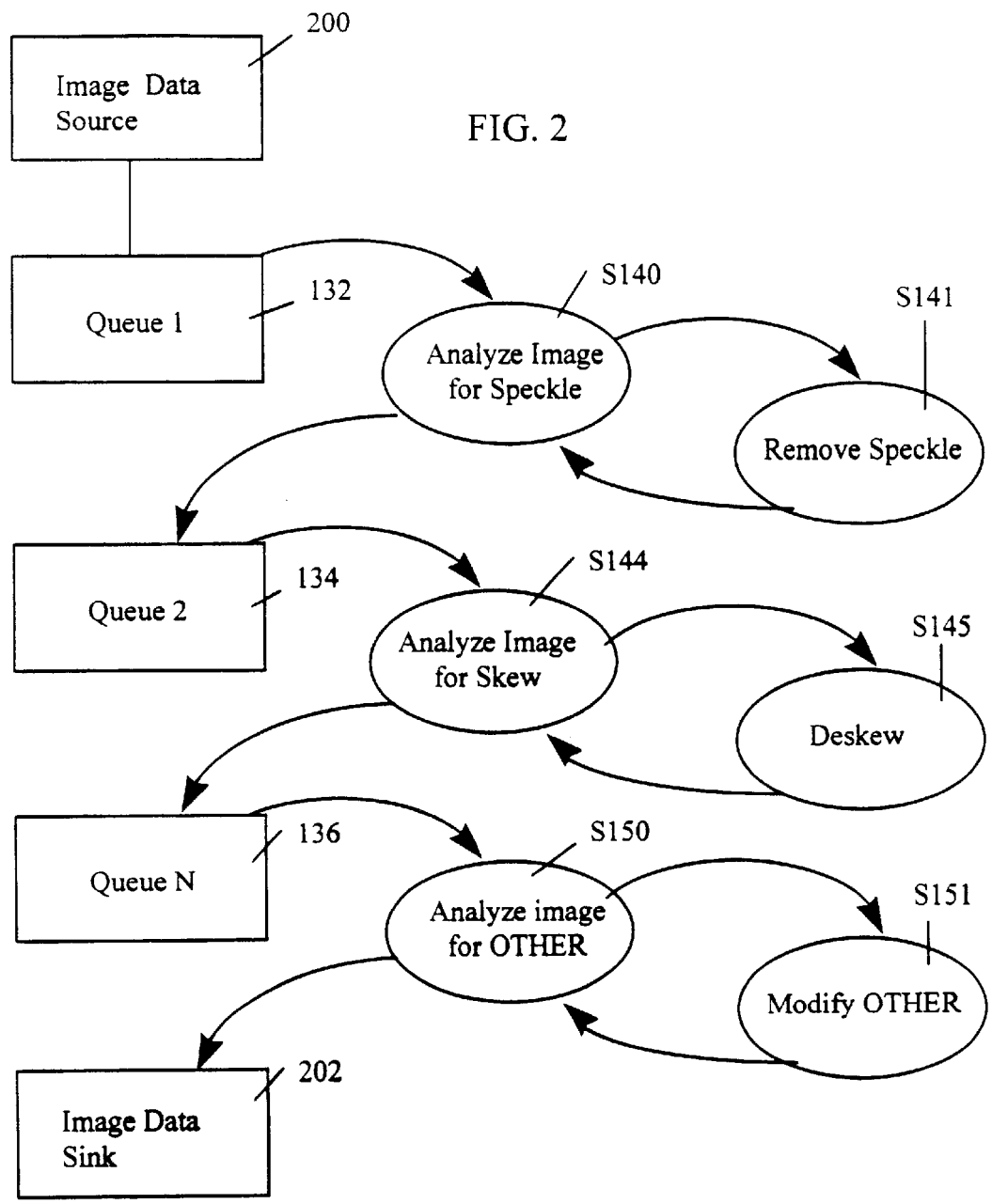
FIG. 2 is a combination functional block diagram and flowchart illustrating how the image data moves through the image processing system 100 of FIG. 1.

FIG. 2 is a combination functional block diagram and flowchart illustrating how the image data moves through the image processing system 100 of FIG. 1.

As shown in FIG. 2, image data to be processed is received from the image data source 200 and stored in the first queue 132. Then, either the process can be signaled to be started from the first queue 132 or the controller 120, or a process executing on the controller 120 can continually analyze the first queue 132 for the appearance of image data.

In step S140, the image data in the first queue 132 is analyzed for the ability to remove speckles. After the image data in the first queue 132 is analyzed, any speckle noise needing removed is processed in step S141. The process then returns to step S140 where the modified image data is reanalyzed for additional possible speckle removal. Alternatively, the step could return the image data to the second queue 134 or perform additional image processing.

In step S144, the image data in the second queue 134 is analyzed for the ability to remove skew. After the image data in the second queue 134 is analyzed, any skew needing removed is processed in step S145. The process then returns to step S144 where the modified image data is reanalyzed for additional possible skew removal. Alternatively, the step could return the image data to the Nth queue 136 or perform additional image processing.

In step S150, the image data in the Nth queue 136 is analyzed for other data. After the image data in the Nth queue 136 is analyzed, any OTHER data needing modified is processed in step S151. The process then returns to step S150 where the modified image data is reanalyzed for additional possible modification. Alternatively, the step could return the image data to the image data sink 202 or perform additional image processing.

The Nth queue 136 represents the next numbered queue in order taking into account the fact that there may be multiple queues and/or the queues may be created dynamically and destroyed as needed by the process and/or apparatus.

The process is repeated as many times as necessary for as many modules as necessary using as many queues as necessary to process the image. The image data is then transferred to the image data sink 202 as described above.

Figure 3:
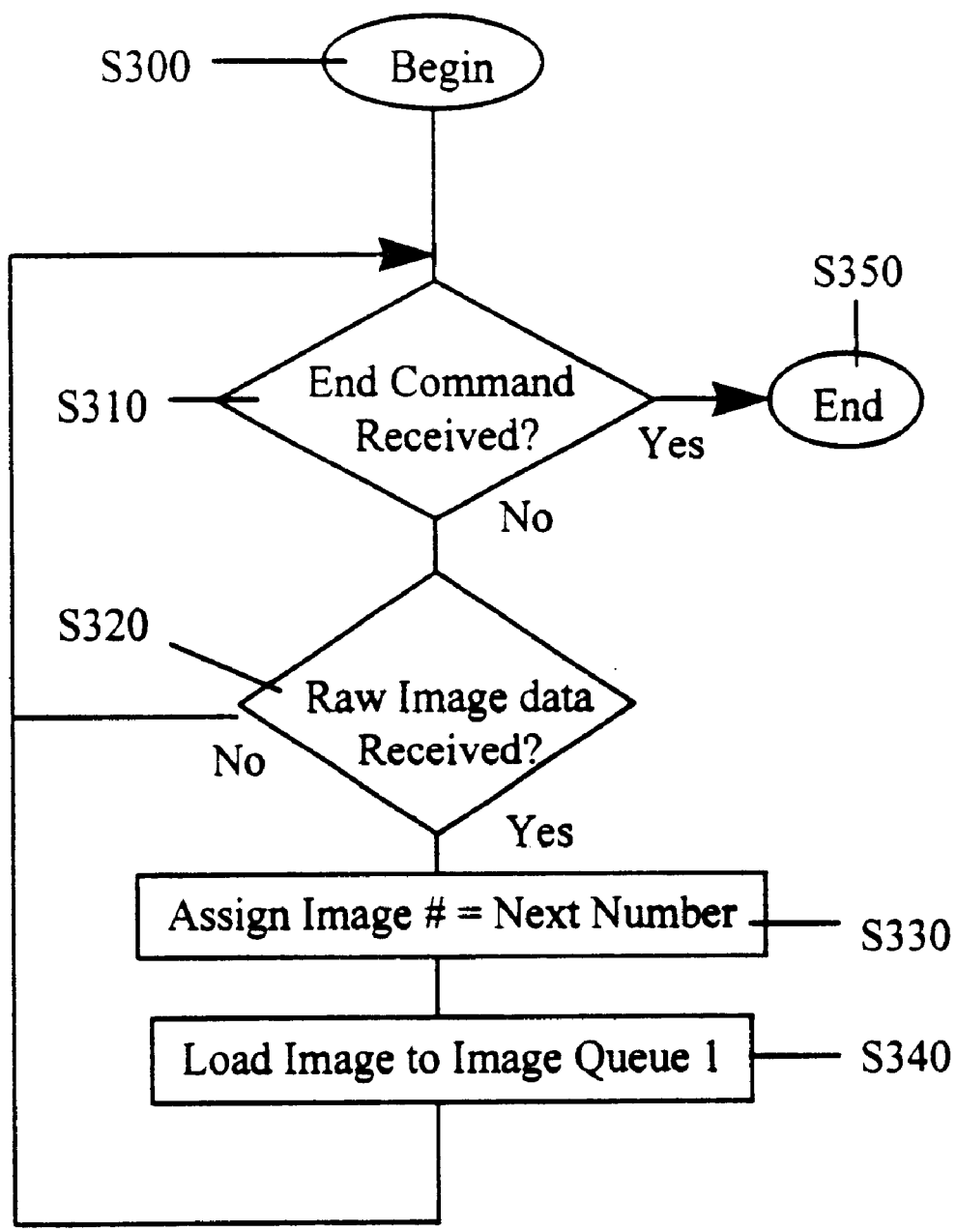
FIG. 3 is a flowchart outlining one exemplary embodiment of a method for processing image data by this invention.

FIG. 3 is a flowchart outlining one exemplary embodiment of a method for accepting the image data into the process according to this invention. The process begins in step S300 and continues to step S310 where a determination is made whether an end command has been received. If the end command has been received, control passes to step S350. If the end command has not been received, the control continues to step S320.

In step S320, a determination is made whether any image data has been received from the image data source. If no image data has been received, control returns to step S310. Otherwise, if image data has been received, control continues to step S330.

In step S330, the received image data is assigned to the next available image number. Then, in step S350, the image is stored in a first queue. Control then returns to step S310.

Figure 4:
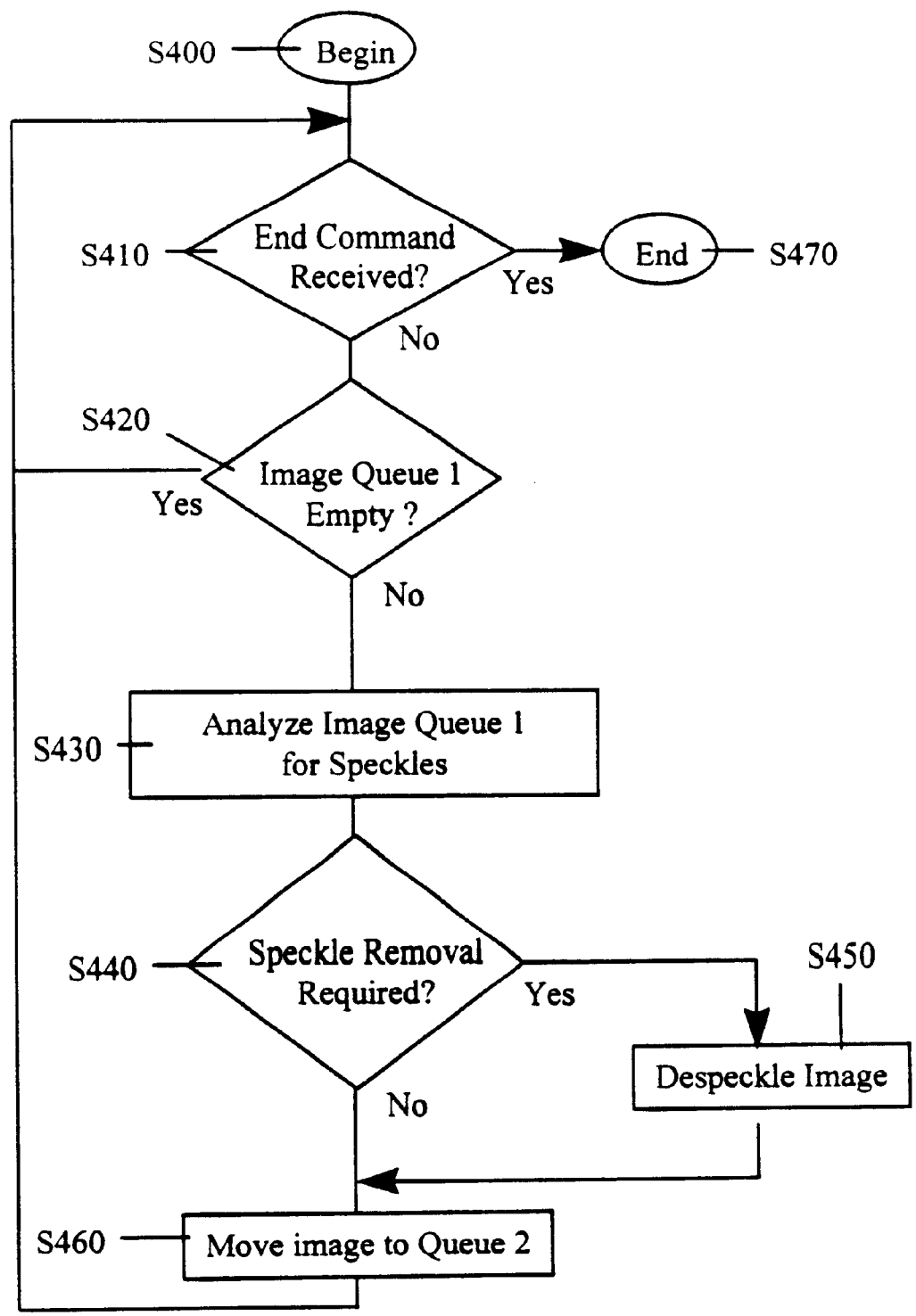
FIG. 4 is a flowchart outlining one exemplary embodiment of a method for analyzing and despeckling of this invention.

FIG. 4 is a flowchart outlining one exemplary embodiment of a method for processing the image data according to this invention. The process begins in step S400 and continues to step S410, where a determination is made whether an end command has been received. If the end command has been received, control passes to step S470. Otherwise, if the end command has not been received, control continues to step S420.

In step S420, a determination is made whether a first image queue has received any image data. If no image data has been received, control returns to step S410. Otherwise, if image data has been received, control continues to step S430.

In step S430, the image data is analyzed for speckles. Next, in step S440, a determination is made whether speckle removal is required. If speckle removal is required, control continues to step S450. If speckle removal is not required, control jumps directly to step S460.

In step S450 speckle noise is removed form the image data. Then, in step S460 the image data is stored in a second queue. Control then returns to step S410.

Figure 5:
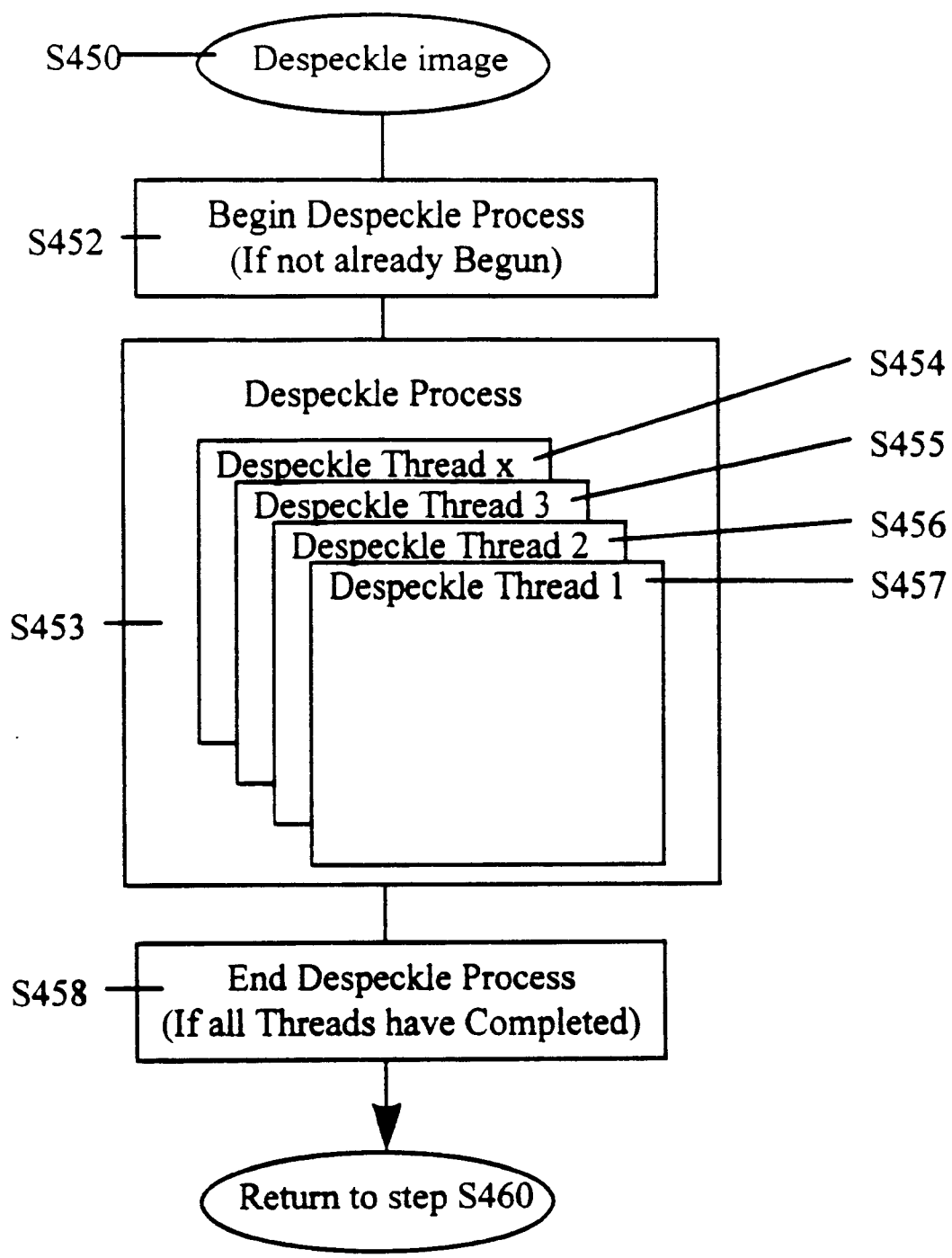
FIG. 5 is a flowchart outlining in greater detail one exemplary embodiment of the methods for despeckling an image of FIG. 4.

FIG. 5 is a flowchart outlining in more detail one exemplary embodiment of a method for despeckling the image data of step S450. Beginning in step S450, control continues to step S452, where a despeckle process is started if it is not already running. Then, in step S453, individual images are despeckled in individual threaded processes S454–S457. Each individual thread S454–S457 processes an image data portion to remove speckles. Control then passes to step S458.

In step S458 the despeckle process begun in step S451 is ended if all individual despeckle threads S454–S457 have completed. Then, in step S459, control returns to step S460 for each individual image data portion as soon as the despeckle process S453 has processed that image data portion.

Figure 6:
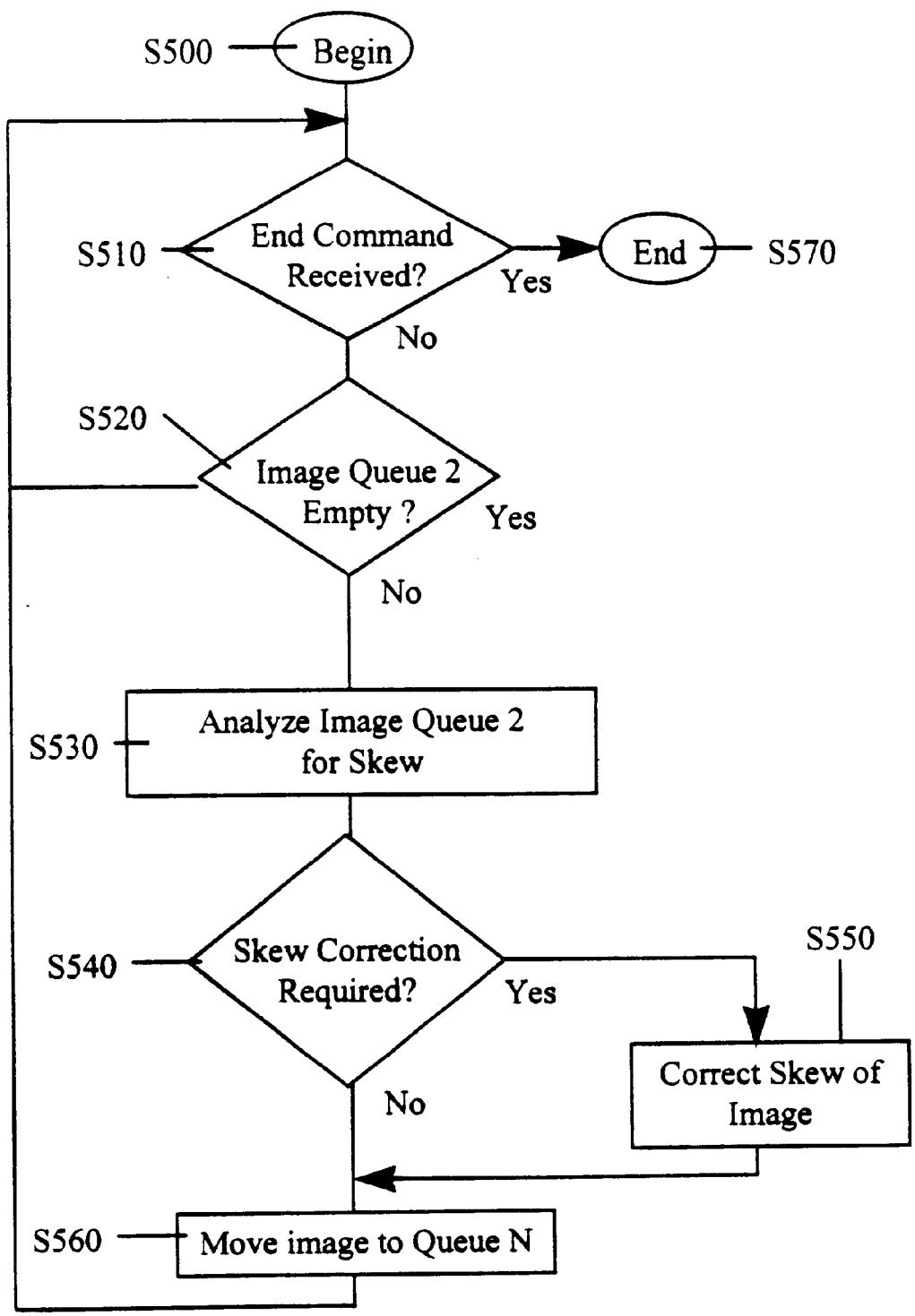
FIG. 6 is a flowchart outlining one exemplary embodiment of a method for analyzing and removing skew of this invention.

FIG. 6 is a flowchart outlining one exemplary embodiment of a method for processing the image data according to this invention. Beginning in step S500, control continues to step S510, where a determination is made whether an end command has been received. Otherwise, if the end command has been received, control passes to step S570. If the end command has not been received, the control continues to step S520.

In step S520, a determination is made whether a second image queue has received image data. If no image data has been received, control returns to step S510. If image data has been received, control continues to step S530.

In step S530, the image data is analyzed for skew. In step S540, a determination is made whether skew removal is required. If skew removal is required, control continues to step S550. Otherwise, if speckle removal is not required, control jumps directly to step S560.

In step S550, skew bias of the image data is modified. Next, in step S560 the image data is stored in an Nth queue. Control then returns to step S510.

Figure 7:
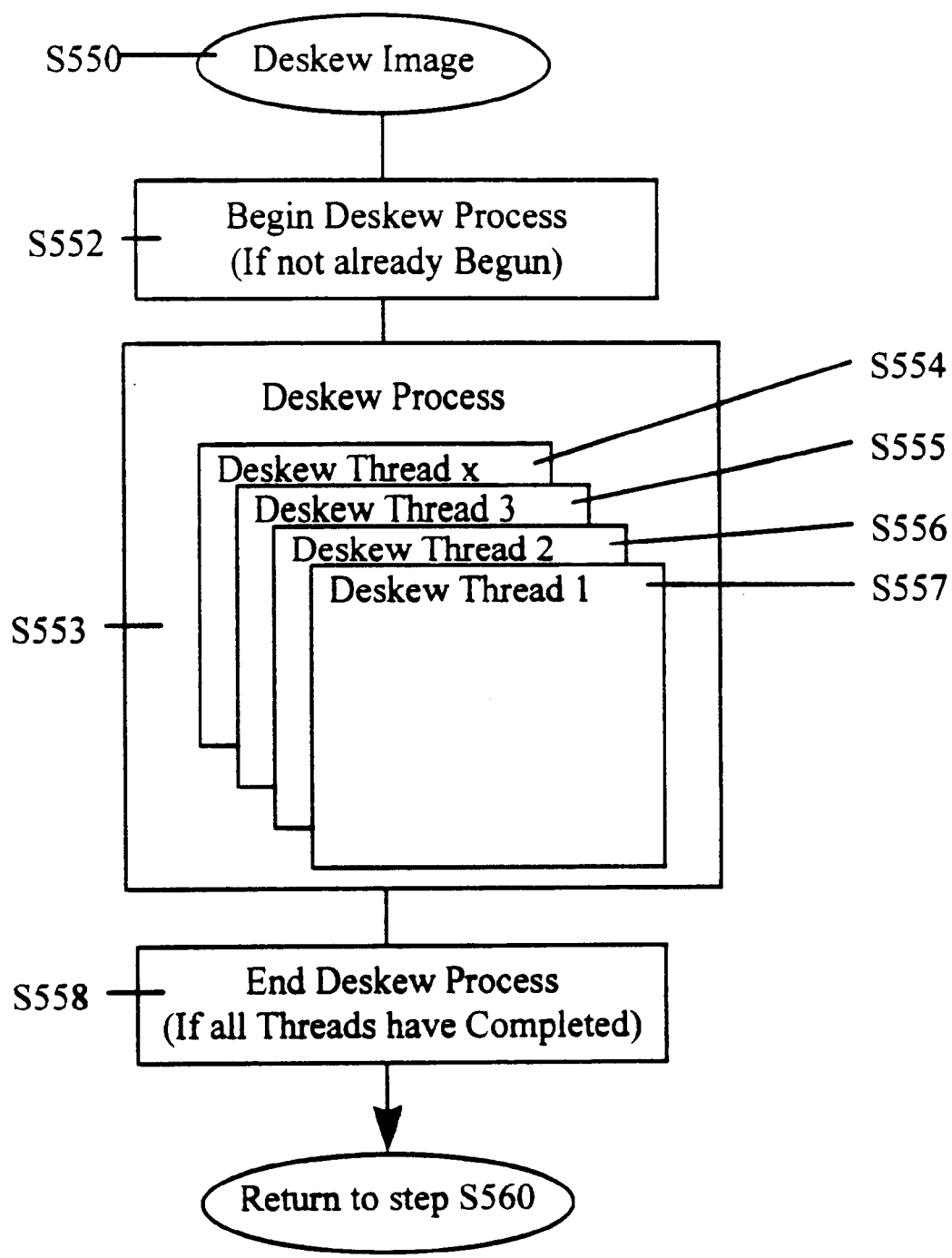
FIG. 7 is a flowchart outlining in greater detail one exemplary embodiment of the methods for deskewing an image of FIG. 6.

FIG. 7 is a flowchart outlining in more detail one exemplary embodiment of a method for deskewing the image data according to this invention. Beginning in step S550, control continues to step S552, where a deskew process is started if it is not already running. Next, in step S553, individual images are deskewed in individual threaded processes S554–S557. Each individual thread S554–S557 processes an image data portion to remove skew. Then, in step S558, the deskew process begun in step S552 is ended if all individual deskew threads S554–S557 have completed. Next, in step S558, control returns to step S560 for each individual image data portion as soon as the deskew process S553 has processed that image data portion.

Figure 8:
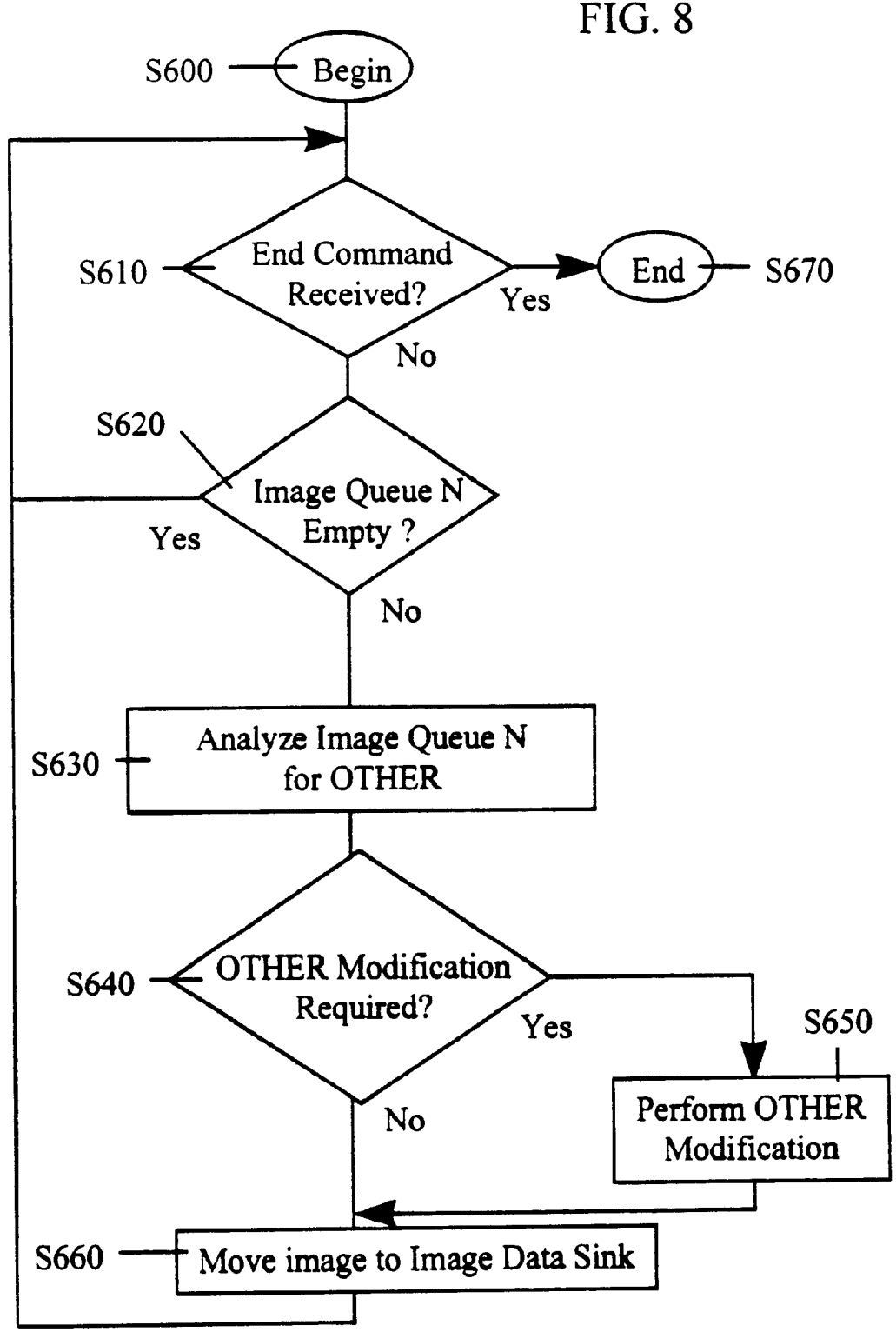
FIG. 8 is a flowchart outlining one exemplary embodiment of a method for analyzing an image for other processing techniques of this invention.

FIG. 8 is a flowchart outlining one exemplary embodiment of a method for processing the image data according to this invention. Beginning in step S600, control continues to step S610, where a determination is made whether an end command has been received. If the end command has been received, control passes to step S670. Otherwise, if the end command has not been received, control continues to step S620.

In step S620, a determination is made whether an Mth image queue has received image data. If no image data has been received, control returns to step S610. Otherwise, if image data has been received, control continues to step S630.

In step S630, the image data is analyzed for any other desired image quality or feature. Then, in step S640, a determination is made whether any processing relevant to the desired other image quality or feature is required. If so, control continues to step S650. Otherwise, control jumps to step S660.

In step S650, the other desired image quality or feature is modified as appropriate. Next, in step S660, the image data is passed to the image data sink. Control then returns to step S610.

Any other desired image quality or feature data is an example of methods and data types not specifically named herein. Those skilled in the art will be able to substitute numerous methods and data types that can be analyzed and modified in various ways to accomplish the intent of the invention without modifying the scope of the invention.

In addition, the exemplary analyze and modification steps above may be accomplished by known or later developed methods for analyzing and modifying data. Any appropriate method may be used by the designers of a specific implementation to analyze and modify the image.

The exemplary flowcharts described above are shown and discussed in a linear manner for ease of description. It should be appreciated that several steps may occur at one time, or the same step may handle several pieces of data at the same time utilizing threads, pipes, or other parallel, multitasking means. The particular naming and programmatic sequencing, arranging and coding will be apparent to those of ordinary skill in the art when adapting the systems and methods described above to a particular operating system or circuit combination.

The exemplary embodiments are described as a series of flow charts. It will be appreciated that those skilled in the art may break or combine the flow charts into objects and classes in different combinations as appropriate for a particular operating system or circuit combination. In addition, the objects and classes may be implemented as portions of, or make calls to, a dynamic link library, or application programming interface.

While this invention has been described with references to exemplary embodiments outlined above, modifications and alterations will be apparent to those skilled in the art upon reading and understanding this specification. Accordingly, the exemplary embodiments of the invention, as set forth above, are intended to be illustrative, not limiting. Various changes may be made without departing from the spirit and scope of the invention.

What is claimed is:

1. A method of processing image data, comprising:
   inputting a plurality of image data portions representing one or more images to be processed;
   storing a first portion of the image data in a memory;
   while inputting and storing a second portion of the image data in a memory, analyzing the first portion of the image data to determine if the first portion of the image data needs to be modified by one or more processing methods, and;
   repeating, as needed, the inputting and storing steps for additional portions of image data while analyzing preceding portions of image data to determine if the image data needs to be modified by one or more processing methods, wherein the preceding portions of image data include at least the first and second portions of image data.

2. The method of claim 1, further comprising modifying each of the plurality of the portions of image data as necessary by the one or more processing methods while analyzing the preceding portions of image data.

3. The method of claim 1, wherein the memory includes at least one of one or more queues, stacks, address spaces, registers, files, arrays and buffers.

4. The method of claim 1, wherein each processing method includes one or more of skew, rotation, flip, sharpness, speckle, and saturation.

5. The method of claim 1, wherein the image data is one or more of a raster file, postscript file, JPG file, scanner data, digital camera data, digital copier data, and facsimile device data.

6. The method of claim 1, wherein the processing and analyzing methods are selectable by a user.

7. The method of claim 1, wherein repeating the inputting and storing steps comprises:
   while inputting and storing a third portion of the image data in a memory, analyzing the second portion of the image data to determine if the second portion of the image data needs to be modified by one or more processing methods, and processing the first portion of the image data by one or more processing methods.

8. The method of claim 7, wherein repeating the inputting and storing steps further comprises:
   while inputting and storing a fourth portion of the image data in a memory, analyzing the third portion of the image data to determine if the third portion of the image data needs to be modified by one or more processing methods, processing the second portion of the image data by one or more processing methods, and analyzing the first portion of the image data to determine if the first portion of the image data needs one or more additional processing methods.

9. A method of processing image data, comprising:
   inputting a plurality of image data portions representing one or more images to be processed;
   storing a first portion of the image data in a memory;
   while inputting and storing a second portion of the image data in a memory, processing the first portion of the image data by one or more processing methods, and;
   repeating, as necessary, the inputting and storing steps for additional portions of image data while processing the preceding portions of image data by one or more processing methods, wherein the preceding portions of image data include at least the first and second portions of image data.

10. The method of claim 9, wherein the memory is at least one of a one or more queues, stacks, address spaces, registers, files, arrays and buffers.

11. The method of claim 9, wherein the processing method is one or more of skew, rotation, flip, sharpness, speckle, and saturation.

12. The method of claim 9, wherein the image data is one or more of a raster file, postscript file, JPG file, scanner data, digital camera data, digital copier data, and facsimile device data.

13. The method of claim 9, wherein the processing and analyzing methods are selectable by a user.

14. The method of claim 9, wherein repeating the inputting and storing steps comprises:
   while inputting and storing a third portion of the image data in a memory, processing the second portion of the image data by one or more processing methods, and processing the first portion of the image data by one or more additional processing methods.

15. An apparatus for processing image data from an image data source that creates or stores a plurality of image data portions, comprising:
   a memory structure that stores one or more analysis or processing methods and that stores two or more image data portions before analysis or processing, during analysis or processing and after analysis or processing, such that the apparatus can continue to receive and store image data, and;
   one or more processing circuits usable to analyze or process the two or more image data portions using at least one of the one or more analysis or processing methods while the apparatus continues to receive and store additional image data portions.

16. The apparatus of claim 15, wherein the processing circuit is selectable.

17. The apparatus of claim 15, wherein the storage structure includes one or more of alterable memory, non-alterable memory, optical memory devices, magnetic memory devices, or cache memory.

18. The apparatus of claim 15, wherein the one or more processing circuits are usable to process a first portion of the image data and to analyze a second portion of the image data, while the apparatus receives and stores a third portion of the image data.

19. The apparatus of claim 18, wherein the one or more processing circuits are usable to re-analyze the first portion of the image data, to process the second portion of the image data, and to analyze the third portion of the image data, while the apparatus receives and stores a fourth portion of the image data.

20. An apparatus for processing image data from an image data source that creates or stores a plurality of image data portions, comprising:

a memory structure that stores one or more image analysis methods and one or more image modification methods, and that stores two or more image data portions before modification, during modification and after modification, and;

one or more processing circuits usable to analyze and modify the two or more image data portions using at least one of the one or more analyzing and modification methods while the apparatus continues to receive and store additional image data portions.

21. The apparatus of claim 20, wherein the processing circuit reanalyzes the image data after the modification circuit is used.

22. The apparatus of claim 21, wherein the processing circuit is selectable.

23. The apparatus of claim 21, wherein the storage structure includes one or more of alterable memory, non-alterable memory, optical memory devices, magnetic memory devices, or cache memory.

24. The apparatus of claim 20, wherein the one or more processing circuits are usable to analyze and modify a second portion of the image data and to re-analyze and re-modify a first portion of the image data after analyzing and modifying the first portion of the image data, while the apparatus receives and stores a third portion of the image data.

* * * * *